United States Patent [19]

Sevennec et al.

[11] Patent Number: 4,650,056
[45] Date of Patent: Mar. 17, 1987

[54] POWER ACTUATOR FOR A MACHINE ELEMENT SUCH AS A CLUTCH

[75] Inventors: Yvon Sevennec, Vernouillet; Rabah Arhab, Pierrefitte, both of France

[73] Assignee: Valeo, Paris, France

[21] Appl. No.: 736,265

[22] Filed: May 21, 1985

[30] Foreign Application Priority Data

May 28, 1984 [FR] France .................... 84 08323

[51] Int. Cl.[4] ............. F16D 13/44; F16D 19/00
[52] U.S. Cl. ............................ 192/90; 192/99 S; 74/89.14; 74/89.19
[58] Field of Search ........... 192/90, 99 S, 111 R, 192/111 A; 74/10.85, 89.11, 89.14, 89.18, 89.19, 516, 517, 518, 97, 100 R

[56] References Cited

U.S. PATENT DOCUMENTS

| | | | |
|---|---|---|---|
| 1,328,635 | 1/1920 | Lichtenberg | 192/99.5 |
| 1,698,656 | 1/1929 | Ream | 74/516 |
| 2,027,659 | 1/1936 | Weisbrod | 192/99 S |
| 2,402,932 | 6/1946 | Van Buskirk | 74/97 |
| 2,440,928 | 5/1948 | Bower | 74/100 R |
| 2,529,660 | 11/1950 | Meyer et al. | 74/10.85 |
| 3,184,989 | 5/1965 | Rhodes | 74/97 |
| 3,400,606 | 9/1968 | Schroter | 74/97 |
| 3,731,555 | 5/1973 | Fresmann | 74/100 R X |
| 3,937,462 | 2/1976 | Kusmer | 74/100 R |

FOREIGN PATENT DOCUMENTS

| | | | |
|---|---|---|---|
| 1181194 | 6/1959 | France. | |
| 2541793 | 8/1984 | France. | |
| 485962 | 10/1953 | Italy | 74/518 |
| 812573 | 4/1959 | United Kingdom | 74/10.85 |
| 826459 | 1/1960 | United Kingdom | 192/99 S |
| 2117076 | 10/1983 | United Kingdom. | |

Primary Examiner—Rodney H. Bonck
Assistant Examiner—David A. Testardi
Attorney, Agent, or Firm—Charles E. Brown; Charles A. Brown

[57] ABSTRACT

The power actuator comprises a housing in which are mounted a motor-driven worm gear and an actuating shaft for controlling the operative condition of a machine element. Rotary motion of the worm gear is transmitted to the actuating shaft by one or more gear wheels and a sector gear which is fixed for angular movement with the actuating shaft. The gear wheel meshes with the sector gear. A force moderating spring is disposed inside and is attached to the housing. The force moderating spring is attached to a link which extends alongside a portion of the sector gear and which is connected to the gear wheel for transmitting the spring force thereto.

11 Claims, 7 Drawing Figures

POWER ACTUATOR FOR A MACHINE ELEMENT SUCH AS A CLUTCH

BACKGROUND OF THE INVENTION

The present invention relates to a power actuator for a machine element such as a clutch, a variable speed change device or a brake.

In a known power actuator of the foregoing kind there is provided a housing in which are mounted a motor-driven worm gear and an actuating shaft adapted to control the operative condition of the machine element, that is, engagement or disengagement in case of a clutch or a brake or a greater or lesser speed ratio in the case of a variable speed change device. Such a power actuator also comprise motion transmitting means between the worm gear and the actuating shaft comprising gear means rotatable inside the housing and a sector gear arranged inside the housing and fixed for angular movement with the actuating shaft, the gear means cooperating with the worm gear, with the sector gear and with a force moderating spring attached to the housing.

In general such a power actuator has produced excellent results in as much as the presence of power output of the motor is reduced by means of the force moderating spring. Further, the entire power actuator as described above which comprises a worm gear, gear means and a sector gear is both simple and robust and is entirely satisfactory in operation.

PRIOR ART

In heretofore known power actuators such as disclosed in UK patent application No. 2,117,076 the housing, generally speaking, is if not voluminous at the very least bulky in configuration.

It appeared to the applicants that for a convenient accommodation of the power actuator housing in the proximity of the associated machine element, for example for accommodating the housing as conveniently as possible next to a clutch, in the clutch casing or adjacent to the power line of a motor vehicle, the bulk of the housing is a serious handicap.

OBJECT AND SUMMARY OF THE INVENTION

An object of the present invention is to provide a power actuator for a power transmitting machine element such as a clutch, a variable speed change device, or a brake, which in various practical respects is better than known power actuators and which has a housing which has the advantage of being compact and therefore easy to accommodate in a motor vehicle.

According to the invention there is provided a power actuator for a machine element such as a clutch, a variable speed change device or a brake. The power actuator comprises a housing in which are mounted a motor-driven worm gear and an actuating shaft adapted to control the operative condition of the machine element. Motion transmitting means for transmitting rotary motion of the worm gear to the actuating shaft comprises gear means rotatable inside the housing and a sector gear arranged inside the housing and fixed for angular movement with the actuating shaft. The gear means meshes with the sector gear, a force moderating spring is disposed inside and attached to the housing. The force moderating spring is attached to a link which extends alongside a portion of the sector gear and is connected to the gear means for exerting the force spring of the force moderating spring thereon.

Preferably, there is a double link extending alongside a portion of the sector gear on both sides thereof.

In any event owing to the link force moderating spring may be disposed as close as possible to the sector gear.

In practice the angle included between the axis of the force moderating spring and a central radius of the sector gear is substantially less than 90° and preferably less than 45°. This results in a more compact construction.

Preferably, the axis of the spring and the median sectional plane of the sector gear lie in a common central plane P perpendicular to the actuating shaft.

This arrangement makes it possible to provide a substantially flat housing with respect to the common central plane.

Another advantage is to locate all the directional forces in substantially the same plane and therefore avoid the drawbacks resulting from cantilevering.

According to a preferred embodiment the gears forming the gear means are coaxial. This also simplifies the resulting structure.

In an embodiment the gear means comprises a first gear wheel meshing with the worm gear and a second gear wheel fixed for rotation with the first gear wheel and meshing with the sector gear, the link being connected to the second gear wheel.

Alternatively, the gear means comprises a single gear wheel meshing with the worm gear and with the sector gear, the link being connected to the single gear wheel for applying the force of the force moderating spring to the single gear wheel.

Preferably, an axial reaction force absorbing means is provided for the worm gear. The axial force reaction absorbing means comprises, in a preferred embodiment, thrust bearings for mounting the worm gear.

In another embodiment the axial force reaction absorbing means comprises an additional gear wheel which meshes with a thread of the worm gear which has a pitch in the opposite direction to the thread which meshes with the gear means, the additional gear wheel meshing with the sector gear and the gear means.

BRIEF DESCRIPTION OF THE DRAWINGS

Various embodiments are described herein by way of example with reference to the accompanying drawings.

DESCRIPTION OF THE PREFERRED EMBODIMENTS

The embodiment illustrated in FIGS. 1–5 concerns, by way of nonlimiting example, an application of the invention to a power actuator for a power transmitting machine element comprising a diaphragm clutch, in particular for a motor vehicle. It will be understood that the power actuator is, however, adapted to be used for other machine elements such as brakes or variable speed changes devices.

Figure 1:
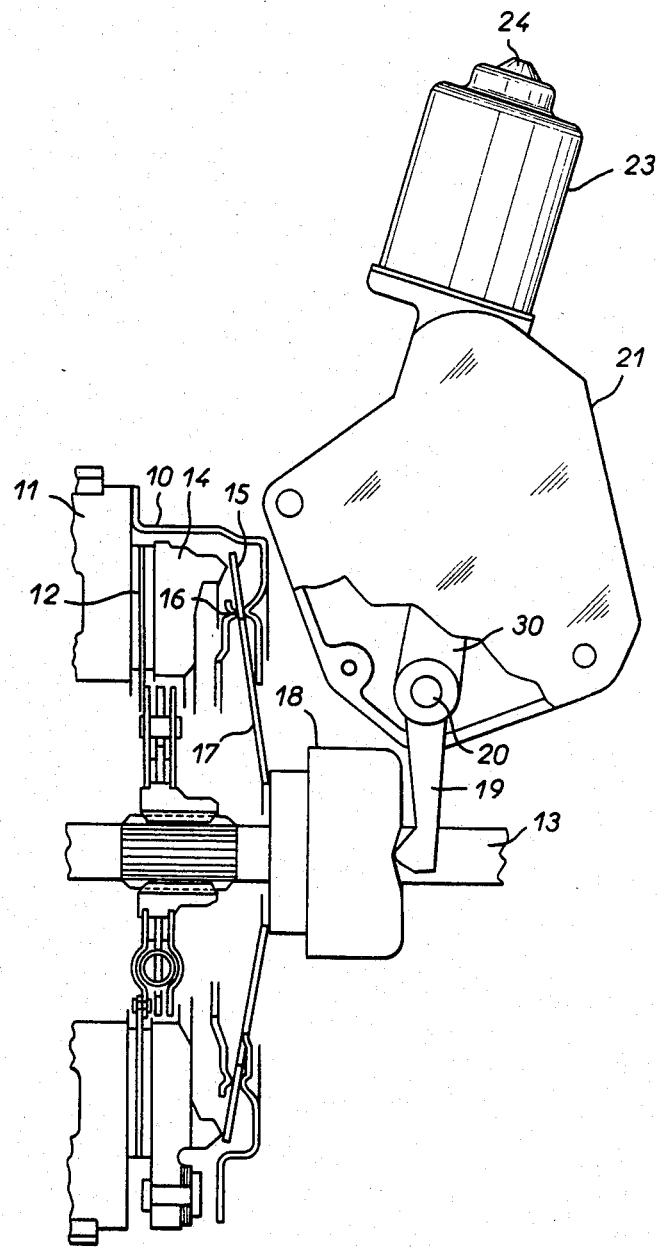
FIG. 1 is a diagrammatic elevational view, partly cut away, of a power actuator for a clutch embodying the invention.

The clutch as shown in FIG. 1 comprises a cover 10 adapted to be fixed to a flywheel 11 of the engine of the motor vehicle. The flywheel 11 defines a reaction plate. The clutch also comprises a clutch plate or driven disc 12 which is splined on an input shaft 13 of a transmission of the motor vehicle. The driven disc 12 is adapted to be clamped between the reaction plate 11 and a pressure plate 14 under the action of resilient clamping action of a diaphragm spring 15.

The diaphragm spring 15 bears against the cover 10 at fulcrum 16 and has a central portion formed by radial fingers 17 adapted to be urged, to the left in FIG. 1, by a clutch release bearing 18. To disengage clutch from its engaged position illustrated in FIG. 1 where the release bearing 18 has no effect on the diaphragm spring 15 to a disengaged position the release bearing 18 pushes against the diaphragm spring 15 to release the clamping action of the pressure plate 14 which frees the driven disc 12.

The clutch release bearing 18 is displaced by a fork lever 19 which is fixed to an actuating shaft 20 which extends transversely with respect to the driven shaft 13 and which thus controls and release bearing 18 for changing the operative condition of the clutch between its engaged and its disengaged position.

There is a power actuator for the actuating shaft 20. In the FIGS. 1–5 embodiment the power actuator comprises a housing 21 in which are mounted a worm gear 22 driven by a small electric motor 23 and the actuating shaft 20.

Figure 2:
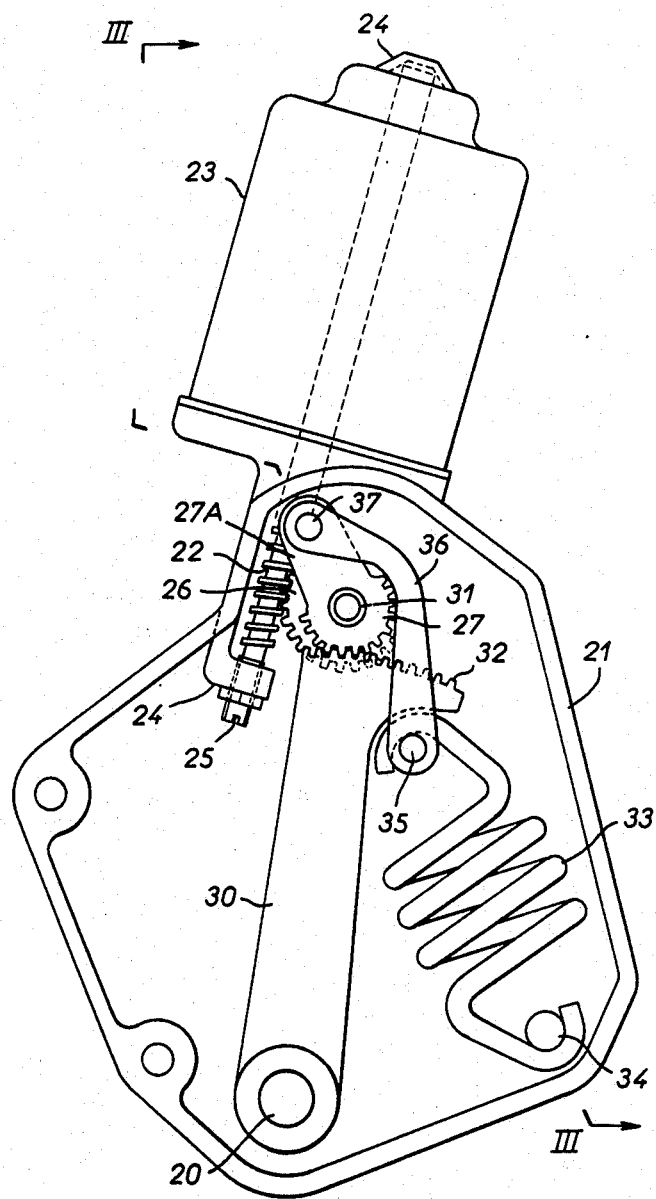
FIG. 2 is an enlarged view of a power actuator taken on line II—II in FIG. 3.

Means are provided for absorbing axial reaction forces exerted on the worm gear 22 and in the embodiment of FIGS. 1–5 the axial force absorbing means comprises two opposed thrust bearings 24 for mounting the worm gear 22. At least one of the thrust bearings 24 is adjustable by means of a screw 25, namely the lower thrust bearing 24 as shown in FIG. 2.

Motion transmitting means are provided between the worm gear 22 and the actuating shaft 20. The motion transmitting means comprises gear means rotatably mounted in the housing and a sector gear 30 fixed for angular movement with the actuating shaft 20.

More specifically, in the embodiment of FIGS. 1–5 the gear means comprises two gear wheels 26, 27 which are located side by side and fixed for rotation with each other inside the housing on a pivot pin 31. It will be understood that gear wheels 26 and 27 are coaxial.

A first gear wheel 26 meshes with the worm gear 22 and the second gear wheel meshes with the teeth 32 of the sector gear 30. Further, the second gear wheel 27 cooperate with a force moderating spring 33 attached by pin 34 to the housing 21. The force moderating spring 33 is adapted to assist the motor 23 to actuate the clutch release bearing 18 thereby reducing the output the motor must provide. The motor 23 therefore may be selected to be both small in size and low rated.

At the other end the force moderating spring 33 is attached to a pin 35. The pin 35 in turn is carried by a link 36 which extends alongside a portion of the sector gear 30. The link 36 is attached to the second gear wheel 27 by pivot pin 37.

According to the invention the force moderating spring 33 is attached to the gear means 26, 27 by the link 36.

In the illustrated embodiments the link 36 is a double link overlying or extending alongside a portion of the sector gear 30 on both sides thereof.

In the position illustrated in FIG. 2 the pins 34, 35 and pivot pins 31, 37 are substantially aligned. To this end the link 36 has an intermediate bend and the gear wheel 27 has a radial projection 27A at the end of which is provided pivot pin 37. The projection 27A projects away from pin 35 relative to pivot shaft 31. Owing to this arrangement which is made possible by a link 36 between the force moderating spring 33 and the gear wheels 26, 27 the force moderating spring 33 may extend into the immediate proximity of the sector gear 30.

In practice the force moderating spring 33 makes an angle with the sector gear which is substantially less than 90° and preferably less than 45° as shown, the angle being included between the axis of the spring 33 and the central radius through the middle radial extension of the sector gear 30.

Figure 3:
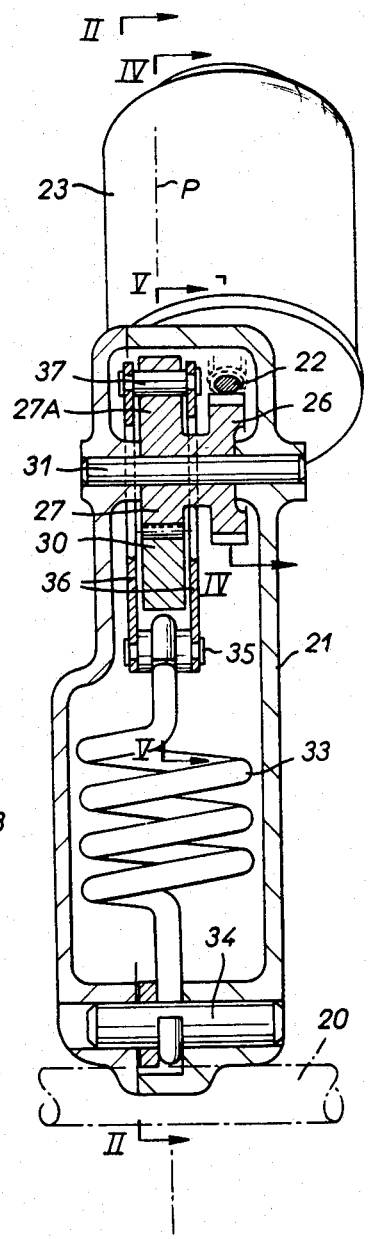
FIG. 3 is a sectional view of the power actuator taken on broken line III—III in FIG. 2.
Figure 4:
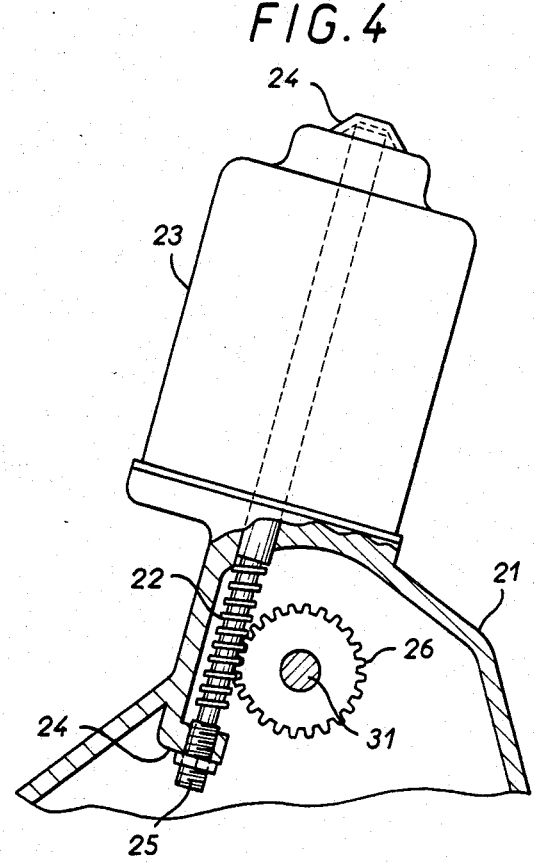
FIG. 4 is a detail sectional view showing the meshing of the gear means with the worm gear, taken on broken line IV—IV in FIG. 3.
Figure 5:
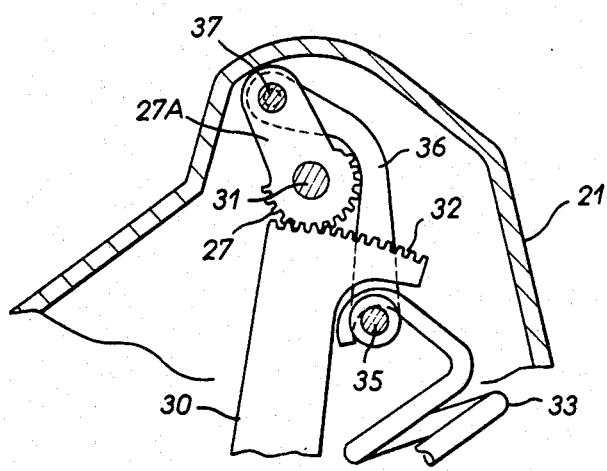
FIG. 5 is a detail sectional view showing the meshing of the sector gear with the worm gear, taken on line V—V in FIG. 3.

Thus, as seen in FIGS. 2 and 3, although the pin 34 by which one end of spring 33 is attached to the housing 21 is spaced from the actuating shaft 20, it is relatively close thereto.

Further, also as seen in FIGS. 2 and 3, the sector gear 30 and the force moderating spring 33 are disposed side by side and have a common general plane P (FIG. 3) which coincides with the axis of the spring 33 and median sectional plane of the sector gear 30, the common general plane P being perpendicular to the axis of the actuating shaft 20. Owing to this arrangement the housing 23 may have a very flat or shallow configuration as apparent in FIG. 3. It follows that the housing 21 is very conveniently accommodated adjacent the power line of a motor vehicle. More specifically, thanks to its compactness, the housing 21 of the power actuator may be easily located next to the clutch to be controlled. Furthermore, all cantilevering is avoided. This results in excellent operating characteristics.

In operation, when the motor-driven worm gear 22 is in the position which corresponds to the clutch engagement position illustrated in FIG. 1, the sector gear 30 acting through the actuating shaft 20, the release fork 19 and the release bearing 18, exerts no appreciable force on the diaphragm spring 15 of the associated clutch. The power actuator is then in the position illustrated in FIGS. 2 and 3, with the pins 34, 35 and pivot pins 31 and 37 all substantially in alignment. The effect of the spring 33 is then virtually nil and the clutch is in its engaged position with the clamping force equal to the entire elastic force of the diaphragm spring 15.

To declutch, the electric motor 23 turns in the appropriate direction. In the meantime the sector gear 30, the actuating shaft 20, the release fork 19 and the clutch release bearing 18 overcome the elastic force of the diaphragm spring 15 thus disengaging the clutch and freeing the driven disc 12. In the course of clutch disengagement the force moderating spring 33 advantageously intervenes with a spring characteristic similar to that of the diaphragm spring 15 thereby reducing the power output the electric motor 23 of the power actuator would otherwise have to provide.

To engage the clutch once again the operation is carried out just as easily but in the opposite direction. Here again the electric motor 23 needs only to provide a low power output. In the position illustrated in FIGS.

1-3, the clutch is in its engaged position under the full elastic force of the diaphragm spring 15 which is in no way diminished by the force moderating spring 33 which is inoperative owing to the alignment of pins 34, 35 and pivot pins 31, 37 as shown in FIG. 2.

Figure 6:
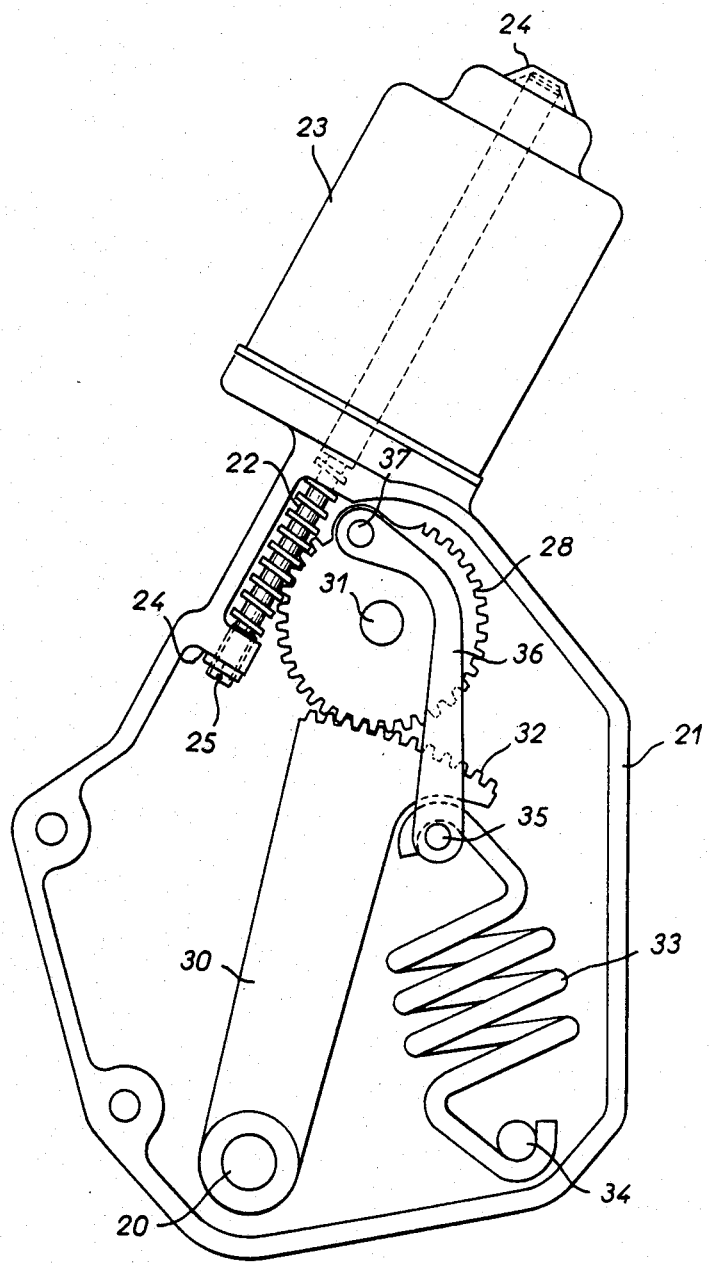
FIGS. 6 and 7 are views similar to that of FIG. 2 for two alternative embodiments.

In the alternative embodiment of FIG. 6 the power actuator is similar to that of the FIGS. 1-5 embodiment but even simpler. The gear wheels 26 and 27 are replaced by a single gear wheel 28 rotatable about pivot 31. The single gear wheel 28 thus meshes with worm gear 22 and the teeth 32 of sector gear 30. The force moderating spring 33 is attached at its ends to pins 34 and 35. The pin 35 is carried by the double lever 36 and pin 37 connects the double lever 36 to the gear wheel 28. The operation of the power actuator of FIG. 6 is substantially the same as that of FIGS. 1-5.

Figure 7:
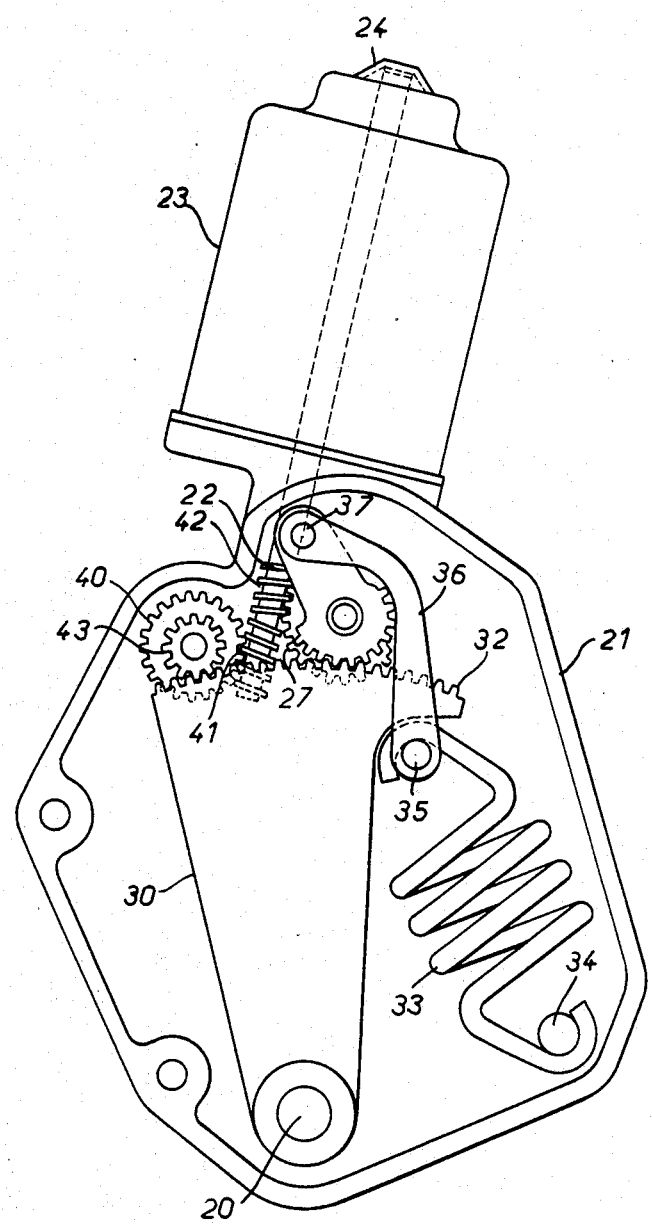

The FIG. 7 embodiment of the power actuator is also similar to that of the previous embodiments but the axial reaction force absorbing means for the worm gear 22 comprises an additional gear wheel 40 instead of a pair of thrust bearings 24. The additional gear wheel 40 meshes with the thread 41 of the worm gear 22 which has an opposite pitch to that of thread 42 which meshes with the gear means defined in the FIG. 7 embodiment by gear wheel 27. The additional gear wheel 40 is fixed for rotation with a gear wheel 43 which meshes with teeth 32 of the sector gear 30 and with the gear wheel 27. The operation of the FIG. 7 embodiment is substantially the same as that described above with respect to the embodiment of the FIGS. 1-5.

The invention is not intended to be limited to the illustrated and described embodiments but admits of various modifications and alternatives in its structure and applications understood to those skilled in the art without departing from the scope of the appended claims.

What we claim is:

1. A power actuator for a machine element such as a clutch, a variable speed change device or a brake, said power actuator comprising a housing, a motor-driven worm gear and an actuating shaft for controlling the operative condition of the machine element being arranged in said housing, motion transmitting means for transmitting rotary motion of said worm gear to said actuating shaft, said motion transmitting means including gear means rotatable inside said housing and meshing with said worm gear and a sector gear arranged inside said housing and fixed for angular movement with said actuating shaft, said gear means also meshing with said sector gear, a force moderating spring disposed inside and attached at one end to said housing, said force moderating spring also attached at an opposite end to a link, said link being connected to said gear means at a location beyond the rotational axis of the gear means relative to said sector gear, said gear means and said sector gear meshing at a location intermediate an attachment zone of said force moderating spring to said link and an attachment zone of said link to said gear means, the attachment of the spring to the housing being spaced from the actuator shaft, said moderating spring having an axis extending at an angle less than about 90° to a central radius of said sector gear, said axis of said force moderating spring lying in a plane generally perpendicular to said actuating shaft and containing said sector gear, said link extending alongside a portion of said sector gear for applying the spring force of said force moderating spring to said gear means.

2. The power actuator according to claim 1, wherein said link is a double link extending alongside a portion of said sector gear on both sides thereof.

3. The power actuator according to claim 1, wherein said link has a bend intermediate its ends.

4. The power actuator according to claim 1, wherein the angle included between the axis of the force moderating spring and the central radius of said sector gear is less than 45°.

5. The power actuator according to claim 1, wherein said gear means comprises a first gear wheel meshing with said worm gear and a second gear wheel fixed for rotation with said first gear wheel and meshing with said sector gear, said link being connected to said second gear wheel.

6. The power actuator according to claim 5, wherein said second gear wheel includes a radially outward projection connected to said link for applying the force of said force moderating spring to the gear means.

7. The power actuator according to claim 5, wherein said first and second gear wheels are coaxial.

8. The power actuator according to claim 1, wherein said gear means comprises a single gear wheel meshing with said worm gear and with said sector gear, said link being connected to said single gear wheel for applying the force of said force moderating spring to said single gear wheel.

9. The power actuator according to claim 1, further comprising axial reaction force absorbing means for said worm gear.

10. The power actuator according to claim 9, wherein the axial reaction force absorbing means comprises thrust bearings for mounting said worm gear.

11. The power actuator according to claim 9, wherein said axial reaction force absorbing means comprises an additional gear wheel which meshes with a thread of said worm gear having a pitch opposite to that of another thread of said worm gear which meshes with said gear means, said additional gear wheel meshing with said sector gear.

* * * * *